H. OLDENDORPH.
SPOKE SOCKET.
No. 181,708. Patented Aug. 29, 1876.
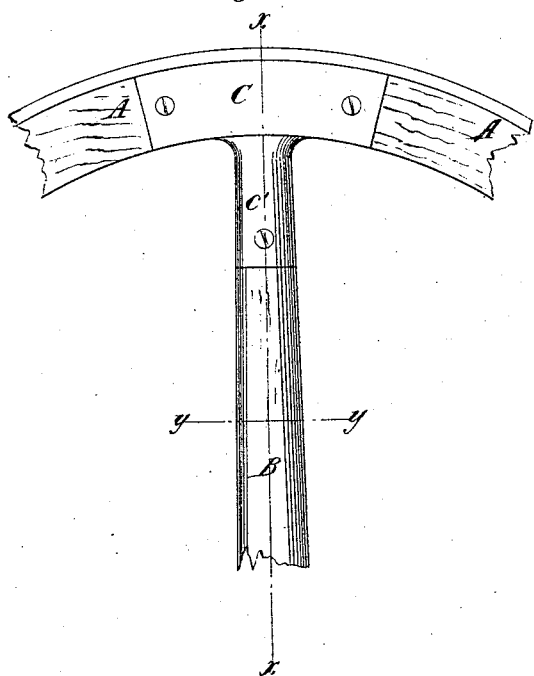
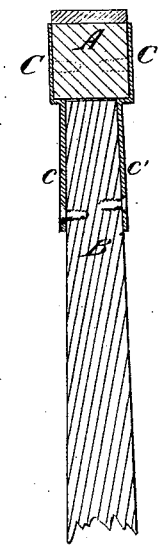
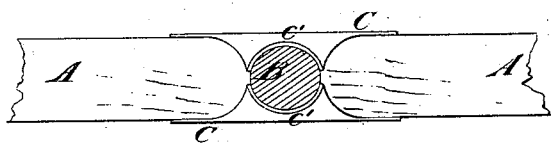

UNITED STATES PATENT OFFICE.

HENRY OLDENDORPH, OF WATERLOO, ILLINOIS.

IMPROVEMENT IN SPOKE-SOCKETS.

Specification forming part of Letters Patent No. 181,708, dated August 29, 1876; application filed August 7, 1876.

*To all whom it may concern:*

Be it known that I, HENRY OLDENDORPH, of Waterloo, in the county of Monroe and State of Illinois, have invented a new and useful Improvement in Spoke-Fastener, of which the following is a specification:

Figure 1 is a side view of a part of a wheel to which my improvement has been applied. Fig. 2 is a detail section of the same, taken through the line $x$ $x$, Fig. 1. Fig. 3 is a detail section of the same, taken through the line $y$ $y$, Fig. 1.

Similar letters of reference indicate corresponding parts.

The object of this invention is to furnish an improved device for fastening a spoke that has broken off at the shoulder of the tenon, to prevent the spoke from wearing the felly and from rattling, and to prevent the spoke and felly from breaking, and which shall be simple in construction, easily applied to the wheel, and effective in use, holding the spoke securely and firmly in place.

The invention consists in plates provided with shanks, and so formed as to fit upon the side of a felly and spoke, to fasten said spoke when broken off at the shoulder of its tenon, as hereinafter fully described.

A represents the felly, and B the spoke, of a vehicle-wheel. C is a plate of such a shape and size as to fit upon the side of the felly A, and which is provided with a shank, $c'$, which is so formed as to fit upon the side of the spoke B.

The device C $c'$ is cut out of sheet-iron, and is then struck up with dies to bring it to the proper shape.

In using the device one of the plates C $c'$ is applied to each side of the felly and spoke to be fastened, and is secured in place by screws or rivets.

The plates C $c'$ are designed to be made of different sizes, so that they can be obtained to fit wheels of any size, and the owner of the vehicle can apply them for himself whenever needed.

Having thus described my invention, I claim as new and desire to secure by Letters Patent—

As a new article of manufacture, plates C, provided with shanks $c'$, and so formed as to fit upon the side of a felly and spoke, to fasten said spoke when broken off at the shoulder of its tenon, substantially as herein shown and described.

HENRY OLDENDORPH.

Witnesses:
 LOUIS BERSCHE, Jr.,
 MABERY C. RODENBERGER.